Patented Jan. 29, 1952

2,584,086

UNITED STATES PATENT OFFICE 2,584,086

HYDRAULIC FLUID COMPOSITION

Aaron Wachter and Nathan Stillman, Berkeley, Calif., assignors to Shell Development Company, San Francisco, Calif., a corporation of Delaware No Drawing. Application June 8, 1946, Serial No. 675,445

7 Claims. (Cl. 252—77)

The present invention relates to corrosion-inhibiting compositions and particularly to corrosion-inhibiting hydraulic fluid compositions which become diluted with water during their normal life-time. More particularly the invention relates to fluid compositions useful in hydraulically operated apparatus, to pressure-transmitting fluid compositions, and to heat exchange fluid compositions, said fluid compositions containing substantial amounts of water, water-soluble organic materials, and a novel and useful class of corrosion-inhibitors. More specifically, this invention relates to aqueous hydraulic fluids and/or aqueous heat exchange media which contain certain corrosion-inhibiting compounds or substances, which when present in the liquid phase of these media, not only inhibit corrosion of metals contacting the liquid, but also inhibit corrosion of metals during the time that they are exposed to the vapor phase above such a liquid aqueous media.

In the past it has been known to add various substances to hydraulic pressure fluids or heat exchange media in order to inhibit or partially prevent corrosion of metals contacting these liquid media. However, none of the additives which were used as corrosion-inhibitors were sufficiently satisfactory because of one or more of a number of reasons, among which were: only partial corrosion-inhibition which only somewhat delayed break-down or repairs of the hydraulic mechanisms used; insufficient solubility or compatibility of the additive with the hydraulic fluid; the difficulty that previous corrosion inhibitors which are soluble in organic substances are not sufficiently soluble or operative when the organic substances are diluted with water; economic unavailability; and other disadvantages. In general, previous corrosion-inhibitors had the serious disadvantages of being wholly ineffective in the vapor phase above the liquid in the system, and of being only partially effective in the liquid phase in many cases.

It is an object of the present invention to overcome the above and other defects. A primary object of this invention is to provide novel compositions of matter comprising water-containing organic media and suitable additives, which compositions provide liquid-vapor phase prevention of corrosion. It is another object of the present invention to provide a method of inhibiting corrosion of metals in both the liquid and vapor phases attendant upon water-containing hydraulic fluid or heat-exchange systems. It is still another object to provide compositions useful in such a method, which compositions comprise a minor amount of one or more additives contained in initially anhydrous polar water-soluble organic liquid media which are normally subject to dissolving or dispersing water therein during their use. A further object is to provide a class of substances suitable in water-containing liquid media for inhibiting corrosion of metals in both the liquid and vapor phases.

As described in the patent application Serial No. 557,358, filed October 5, 1944, now abandoned, of which the present application is a continuation-in-part, it has been recently discovered that corrosion inhibition of a metal, which is normally corrodible by contact with water vapor, or liquid water, and/or air, may be realized by providing the atmosphere surrounding such metal with the vapors of certain organic corrosion-inhibiting compounds or substances known herein as vapor phase corrosion-inhibitors. These inhibitors may be organic base nitrites, compounds having a nitro-aliphatic nucleus, compounds having a nitro-phenol nucleus, and/or various other organic compounds. It has further been discovered that a preferred class of such inhibitors consists of or comprises organic base nitrite salts, especially organic nitrogeneous base nitrite salts. In general, the organic base nitrite salt which is to be employed as the inhibitor should preferably have a vapor pressure of at least 0.00002 mm. of Hg at 21° C., and preferably greater than about 0.0001 mm of Hg at 21° C.

It has now been discovered that the above and other objects, involving essentially corrosion-inhibition in either or both the liquid and vapor phases, are attained by a composition comprising or containing salts of an organic base with nitrous acid dispersed in a water-containing organic medium. More specifically, in accordance with the invention, these corrosion-inhibiting salts are disposed in a water-containing hydraulic fluid or heat exchange liquid, and the thus-prepared composition is then used as a hydraulic or heat exchange liquid. It has been further found that usually the most preferred inhibitors for dispersion in the media for the purposes mentioned, are the secondary amine nitrites. Also, the media wherein the present inhibitors are used should have a pH value of at least about 6, preferably about 7, while higher pH values may be used without detriment. Preferably, the present volatile organic nitrite salts should have a water-solubility of about 1% by weight, or higher, although the degree of water-solubility may be very low. Also, the inhibitor employed in the present type of media should have a vapor pressure of at least 0.00002 mm. of Hg at 21° C., and preferably greater than about 0.0001 mm. of Hg at 21° C. The present class of inhibitors which prevent corrosion of metals in both the liquid and vapor phases, may also be termed liquid-vapor phase corrosion-inhibitors. It has also been found that the metal walls or parts enclosed within hydraulic machines are prevented from corroding by employing therein a hydraulic fluid containing one or more organic base nitrite salts; this hydraulic fluid may initially be anhydrous.

Representative classes of organic bases which are suitable for preparing the salts used as vapor phase inhibitors according to the present invention, include: primary amines, secondary amines, tertiary amines, cyclic secondary amines of the type of piperidine, oxazines, morpholine, thiazolines, and pyrrolidine; and various nitrogenous bases such as urea, thiourea, hydrazines, hydroxylamines, amidines, and guanidine. In any of the above nuclei, alkyl, cycloalkyl, terpinyl, bornyl, aralkyl, benzyl, phenyl, aryl, and various substituent groups or atomic radicals may be present so long as the sum total basicity of the nitrogenous compound is approximately equal to or greater than the acidity of nitrous acid with which it forms a salt. Among the substituent groups the alkyl and cycloalkyl groups are preferred.

The basicity of the various basic constituents of the class of salts described herein is described, for example, in "The Organic Chemistry of Nitrogen" by N. V. Sidgwick, 1937 edition, and in "Organic Chemistry" by Paul Karrer, 1938 edition.

More specifically and preferably, organic nitrogen base salts of nitrous acid include the following nitrite salts of:

1. Primary amines, such as (a) primary amines in which the amine group is attached to a secondary or a tertiary aliphatic carbon atom as in the following structural formulas:

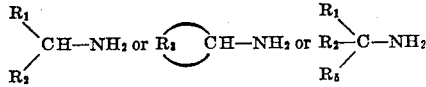

wherein $R_1$, $R_2$ and $R_5$ are hydrocarbon radicals which are aliphatic, alicyclic, heterocyclic, aromatic, ar alkylated cyclic radicals, and may, if desired, contain preferably not more than one olefinic double bond, or $R_1$ and $R_2$ are joined in the form of a cyclo-aliphatic or heterocyclic-aliphatic ring radical $R_3$;

(b) primary amines in which the amine group is attached to an aralkyl group as in the following structural formula:

$$R_4—(CH_2)_n—NH_2$$

wherein $R_4$ is an aromatic hydrocarbon radical, preferably a phenyl or alkylated phenyl radical and $n$ is an integer which is preferably 1 or 2;

(c) primary aliphatic amines, such as methyl amine, which react with nitrous acid in the presence of an excess of the amine to give a primary amine nitrite salt, (as distinguished from a primary aliphatic amine which reacts with nitrous acid to yield nitrogen, an alcohol, or other reaction products).

2. Secondary amines, such as secondary amines in which the amine group is attached to an aliphatic carbon atom, preferably a secondary or tertiary carbon atom, as represented by the following structural formulas:

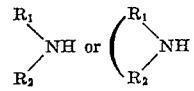

wherein $R_1$ and $R_2$ are hydrocarbon radicals as in 1 (a) and wherein $R_1$ and $R_2$ may be joined in the form of a ring forming

which is either N-alicyclic or contains in the $R_3$ portion of the organic ring atoms of the type of oxygen and/or sulfur.

3. Tertiary amines.

4. Quaternary ammonium bases including pyridinium bases.

Specific examples of organic nitrogen bases suitable for preparation of the organic nitrogen-base nitrite salt vapor phase corrosion inhibitors of the present invention include:

Primary amines: methylamine, isopropyl amine, 2-amino-butane, tertiary butyl amine, 2-amino-4-methyl-pentane, various amyl, hexyl, heptyl, octyl, and higher homologous primary amines wherein the group is attached to a secondary or tertiary carbon atom; cyclopentyl amine, alkylated cyclopentyl amines, cyclohexylamine, mono-methyl cyclohexylamines, di-methyl cyclohexylamines, trimethyl cyclohexylamines, other alkylated cyclohexylamines, bornyl amine, fenchyl amine, cycloterpenyl amines, pinyl amine, benzylamine, beta-phenylethyl-amine, alkylated benzylamines, tetrahydro beta-naphthylamine, allyl amine, beta-methyl allyl amine, beta-chloro allyl amine, and their homologs and analogs.

Secondary amines: di-methyl-, di-ethyl-, di-n-propyl-di-isopropyl-, di-butyl-amines; various secondary amines derived from amyl, hexyl, heptyl, octyl, and higher homologous alkyl groups; methyl isobutyl amine, N-methyl N-tertiary-butyl amine, N-alkyl N-cyclohexyl amine, N-alkyl N-bornyl amine, di-bornyl amine, N-methyl N-cycloterpenyl amine, N-isopropyl N-(1)-methyl amine, N-alkyl N-benzyl amines and their homologs and analogs; dicyclopentyl amine, dicyclohexyl amine, alkylated dicyclohexyl amines; di-phenylamine, dibenzylamine, di-(beta phenyl ethyl) amine; piperidine, piperazine, alkylated piperidines or piperazines; 1,4-alkylated and unalkylated oxazines such as morpholine and 2,4,4,6-tetramethyl tetrahydro-1,3-oxazine; alkylated-1,3-thiazolines such as 2,4,4,6-tetramethyl tetrahydro-3-thiazoline.

Secondary amine type derivatives of alkylene diamines, such as:

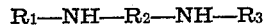

wherein $R_1$ and $R_3$ may be like or different aliphatic, alicyclic, aralkyl, alkarylalkyl, heterocyclic, terpenic radicals, and wherein $R_2$ is an alkylene or cycloalkylene radical. These $R_1$ and $R_3$ radicals for instance, may be isopropyl, butyl, cyclohexyl, benzyl, and/or bornyl radicals. The $R_2$ radical is preferably an ethylene or propylene radical.

Tertiary amines: trimethyl amine, triethylamine, tri-n-propylamine, tri-isopropylamine, tributylamine, higher homologous and isomeric trialkylamines, variously N-substituted tertiary amines having different organic radicals on the amino nitrogen atom, e. g., alkyl, alicyclic, bornyl, fenchyl, aralkyl, and like homologs and analogs;

and tertiary amine type derivatives of alkylene diamines.

Organic nitrogenous bases, particularly guanidine; also diazoles, imidazolines, e. g., 2-heptyl-2-imidazoline, diazines, pyrimidines, and the like.

Quaternary ammonium bases: tetramethyl, tetraethyl, and higher tetraalkyl ammonium bases; trimethyl benzyl-, trimethyl cyclohexyl-, tributyl decyl ammonium bases; various quaternary N-substituted ammonium bases having various organic radicals (of the type described above) on the quaternary nitrogen atom; pyridinium and alkylated pyridinium or quinolinium quaternary ammonium bases having an alkyl, cycloalkyl, or aralkyl group on the quaternary nitrogen atom, including methyl butyl, cyclohexyl, benzyl groups and like homologs or analogs.

The various hydrocarbon radicals or groups of the above organic bases may also contain stable and inert polar substituent atoms or radicals, such as, chlorine, ether, thio-ether, alcohol, free amino, or nitro groups. Neutral ketone, ester and nitrile groups and aliphatic unsaturation may also be present, particularly in the case of allyl and chlorallyl groups.

The salts of nitrous acid and the organic nitrogen bases described above, may be prepared by a stoichiometric reaction of an organic nitrogen base with nitrous acid while maintaining the reaction mixture at least slightly basic in character.

Other organic salts of nitrous acid which are suitable vapor phase inhibitors according to the present invention are the sulfonium, phosphonium, or iodonium organic nitrate salts. Among these onium nitrites, the sulfonium nitrites are preferred. In general, nitrite salts of the isologs of the ammonium compounds, commonly termed "onium" compounds, and which have the general formula $RXH_y$ wherein R is an organic radical which may be alkyl, cycloalkyl, aryl, alkaryl, or heterocyclic; X is an element selected from the group consisting of phosphorus, arsenic, antimony, carbon, oxygen, sulfur, selenium, tin and iodine; and $y$ is an integer which varies from 2 to 4 depending on the valence of X, may suitably be applied as vapor phase inhibitors.

Generally, where the pH value of the present hydraulic liquid compositions is normally greater than about 6, the presence of a basic agent is not necessary. Where the hydraulic liquid has a pH per se of less than about 6, or a potential pH when contacted with water of less than about 6, then the stability of the liquid-vapor phase inhibitors, particularly of the organic nitrogen-base-nitrite salts, is adversely affected. The stability of the inhibitors is usually also adversely affected by elevated temperatures, particularly those of about 120° F. to 150° F. or higher. The effect of such and like factors which render an organic nitrite unstable, is greatly lessened or even entirely obviated by associating with the inhibitor, or the media in which it is disposed, a basic-acting substance. Where a preliminary trial test with a specific hydraulic fluid indicates the need of a basic agent, the latter is usually dispersed or dissolved in the hydraulic fluid prior to the introduction therein of the organic nitrite inhibitor. Suitable stabilizing agents include basic agents which are organic or inorganic compounds that provide a pH value in excess of about 7 when dispersed in water. Suitable stabilizing agents also include basic materials having basic dissociation constants greater, approximately equal to, or slightly less than the dissociation constant of the organic basic material which combined to form the nitrite salt which it may be desired to stabilize. In many cases a preferred stabilizing agent is the free organic nitrogenous base which corresponds to that which was used in the preparation of the organic nitrogenous-base nitrite salt.

As was stated, the present invention is applicable to the prevention of corrosion of metal parts in contact with either a water-containing vapor phase, or a liquid phase or both. Prevention of such corrosion is more particularly applicable in the cases of machinery, instruments, and the like which are subject to corrosion during their normal operation as a result of moisture condensation or the presence of a moist atmosphere, as for example in the case of gyroscopic flight stabilizers, bomb sight mechanisms, hydraulic mechanisms, turbine gears, or like situations present in other mechanisms. Prevention of the corrosion of the surfaces of metal in contact with the vapor spaces present and enclosed by such mechanisms is obtained by including a corrosion-preventing quantity of one or more of the inhibitors according to the present invention, thus maintaining the desired inhibiting atmosphere in contact with the metal surfaces normally tending to become corroded. For example, in hydraulic gun recoil mechanisms, it has been found that the atmosphere in the air space above the hydraulic fluid contained in the mechanism will corrode adjacent metal surfaces, but by the addition of a volatile organic base nitrite salt inhibitor to the hydraulic fluid, such corrosion is entirely obviated. At the same time the inhibitors of the present invention are generally sufficiently soluble in both water and either water-soluble organic materials or hydrocarbon materials, other water-insoluble organic liquids, and the like, that the corrosive tendencies present on the metal contacting the liquid phase are also entirely obviated.

The presently described inhibitors are more effective in preventing corrosion of metal parts occurring in the presence of water at a pH value of approximately 7, or 8, or up to a pH of 12 or even higher and more particularly prevent such corrosion of ferrous metals, e. g., steels, and also aluminum, nickel, chromium, and alloys of these metals.

As an alternative to the incorporation of an organic nitrogenous-base nitrite salt into a hydraulic fluid, more particularly where corrosion-inhibiting action immediately following addition of the fluid to the mechanism is not desired or needed, the nitrosamines which may be formed from a secondary or primary amine nitrite salt may be incorporated into a hydraulic fluid with beneficial results. The relationship between certain of the organic nitrogenous-base-nitrite salts and the nitrosamines consists of an equilibrium which may be stated as follows:

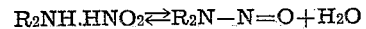
$$R_2NH \cdot HNO_2 \rightleftarrows R_2N-N=O+H_2O$$

wherein at least one R, and preferably both R's, represent an organic radical, and one of the R's may be the hydrogen atom. The above equilibrium with the nitrosamine and water which may be formed from the amine nitrite or vice versa undergoes a shift toward increasing concentrations of the nitrosamine at increasingly higher temperatures. According to the usual laws of equilibrium, an excess of either water or nitrosamine above the chemical mol ratios present in any given equilibrium results in increasing the concentration of the amine nitrite. More specifically, it has now been found that water solutions of nitrosamine slowly yielded increasing concentrations of the amino nitrites and that such solutions when employed as a hydraulic fluid, prevented corrosion of contacting metal parts under conditions of a pH value of at least about 6.

The present inhibitors may advantageously be incorporated in any substantially neutral or basic organic substance which is liquid, semi-solid, or substantially solid, in which the inhibitor is soluble, or with which the inhibitor may be stably dispersed in water. Preferred organic materials are water-soluble organic materials, or those which are capable of forming stable dispersions in water. By a water-soluble organic substance is meant a polar organic solvent material which contains a sufficient number of water-solubilizing groups that it is at least partially miscible with water. Water-soluble organic materials include: low molecular weight mono-hydroxy alcohols, low molecular weight ketones, low molecular weight amines, polyhydroxy alcohols, certain water-soluble amides and amines, low molecular weight esters, various hydroxy-esters, hydroxy-ethers, hydroxy-nitriles, polyamino compounds, and neutral quaternary ammonium compounds. Representative specific examples of the various types of compounds belonging to the broad class of water-soluble organic compounds include: methyl alcohol, ethyl alcohol, propyl alcohol, glycerol, ethylene glycol, diethylene glycol, glycerin mono alpha chlorohydrin, propylene glycol, triethylene glycol, sorbitol, mannitol, pentaerythritol, diacetone alcohol, acetone, methyl ethyl ketone, dioxane, etc. Of these the more preferred are the less volatile alcohols such as the glycols, other higher molecular weight polyhydric alcohols, and the like. Other suitable water-soluble organic materials include: butyl amine, propyl amine, ethylene diamine, 1,3,5-triamino pentane, alkanol amines, e. g., mono-, di-, and triethanol amines, polyether polyamino compounds, morpholine, acetamide, formamide, urea, ureides, ethyl acetate, ethyl lactate, polypropylenoxypolyhydric alcohols, polyethyleneoxy aliphatic polyethers, diethylene glycol monoalkyl ethers of e. g. methyl, ethyl, propyl, and butyl alcohol, diethyl ether of diethylene glycol, 1,2-dihydroxy-acetonitrile, 2-hydroxy-acetonitrile, glycol monoricinoleate, betaine, the various water-soluble betaine derivatives, and like compounds. Other types of compounds which may be used to make up water solutions with the present inhibitors include: trialkyl phosphates, e. g., triethyl phosphate, dipropyl potassium phosphate, disodium phosphate, salts of organic carboxylic, sulfonic, and sulfate acids, sodium naphthenates, soaps, e. g., combinations of acids from castor oil, soybean oil, and various other oils, particularly of ricinoleic acid with alkali metal hydroxides, also trimethyl benzyl ammonium chloride, trimethyl lauryl ammonium hydroxide, or carbohydrates such as mannose, glucose, and various other suitable water-soluble compounds. Some of the less preferred but still suitable organic media used as an essential constituent in hydraulic fluids include: such alicyclic, aromatic, and amino alcohols as cyclohexanol, fenchyl alcohol, borneol, terpenic alcohols, benzyl alcohol, tetrahydrofurfuryl alcohol, ethoxyaminobutanol, and the like; ethers such as diisobutyl ether, ethyl tertiary butyl ether, methyl ricinoleyl ether; aldehydes such as heptaldehyde, capryaldehyde; ketones such as diisopropyl ketone, cyclohexanone; nitrogen-containing compounds such as octyl amine, ethylene diamine, etc.

The present corrosion-inhibitors may be added by incorporating one or more of them into any one or more of the water-soluble organic materials described herein, either with or without water. In many cases it is advantageous to incorporate the inhibitor into the substantially anhydrous water-soluble organic material and then dilute such a composition later with water prior to use as a hydraulic pressure-transmitting medium.

Although the proportion or relative concentration of the organic base nitrite which is to be added to a water-soluble organic material to inhibit or obviate corrosion of a metal in contact therewith in the presence of water, may vary within wide limits, it is usually preferred to add the smallest effective amount. This is usually between about 0.01 wt. per cent and about 30 wt. per cent of the total composition when diluted with water, although for most average cases it is desirable to employ between about 0.1 wt. per cent and about 5 wt. per cent of the total composition. With the corrosion-producing conditions usually encountered with a glycol-water base hydraulic fluid, approximately 0.01% to 5% by weight of the total hydraulic composition is usually sufficient.

While the present organic base nitrites are referred to as being added to a water-soluble organic substance, which contains or is to contain water, it is to be understood that in some instances such corrosion-inhibitors may also exist in the present type of compositions when they are obtained, for example, during the preparation of the organic base nitrite in isopropyl alcohol-water mixtures, or in ethylene glycol-water mixtures. In such case, as long as a corrosion-inhibiting amount of the organic base nitrite is present in the organo-aqueous solution, it may be used directly, or with suitable modification (as by the addition of other additives) employed as an energy-transmitting fluid.

Generally, the compositions described herein may also contain any of the additives known to be compatible with water. For example, the salts of strong inorganic or organic acids and alkyl polyamines and/or of alkylol amines which are known to have no tendency to vaporize and at the same time to markedly depress the freezing point of water, may be added. For instance, triethanolamine salts of such acids as phosphates, oleates, palmitates, and stearates or the like may be disposed in the liquid media containing the described corrosion-inhibitors. Onium bases may also be used, either in a solution or in an emulsion, particularly of the oil-in-water type. The onium base is an aid in inhibiting corrosion of the metals but only in the liquid phase; the onium base also stabilizes the emulsion by neutralizing any traces of acid which may occur. The presence of inorganic salts, such as sodium chloride, calcium chloride, magnesium sulfate, etc., in the aqueous system, does not seriously reduce the effectiveness of the present organic base nitrite salts as corrosion inhibitors.

Other aqueous media, more particularly antifreeze compositions, to which the present invention is applicable, are water solutions of urea, guanidine, and the like, e. g., preferably 25 wt. percent to 33 wt. percent of urea in water, or of a ureid of glucose and urea in water. In place of urea many other amides may be used, preferably 30 wt. percent of either acetamide or formamide, or both, in water with a few per cent of the present salts of nitrous acid and an organic base. Other antifreeze compositions, comprising a water solution of a water-soluble substance having a betaine nucleus, more particularly of trimethyl betaine, as in a 50 wt. percent solution, or more or less, are advantageously treated with the present vapor phase inhibitors, thus preventing corrosion when used.

The present vapor phase corrosion-inhibitors are advantageously incorporated in non-aqueous pressure-transmitting fluid compositions which have a tolerance or capacity for dissolving water therein, usually up to about 20 wt. percent of water or even higher. Examples of this type of non-aqueous compositions include: conventional hydraulic brake fluids made up of various percentages of neutralized or slightly alkalized castor oil, ethylene glycol, Carbitols, with or without ethanol or other alcohol; more generally, typical pressure fluid compositions which comprise essentially any one or more of the following types of compounds, viz., glycerine, a glycol, a glycol ether, a lower aliphatic alcohol, and an ethanolamine; a major amount of di-ethylene glycol monoethyl ether (Carbitol) with a minor amount of fusel alcohol; a major amount of fusel alcohol with a minor amount of triethanolamine; a minor amount of triethanolamine lactate with a major amount of Carbitol; a minor amount of triethanolamine ricinoleate with a major amount of isopropyl alcohol (or butanol); a minor amount of propylene glycol ricinoleate and a major amount of isobutanol; and organic solvent diluent with a ricinoleyl alcohol, a ricinoleyl ester, or a ricinoleyl amine, e. g., about 50 wt. percent isobutanol, about 16 wt. percent methyl ricinoleate, and the rest a mixture of common polyhydric alcohols; mixtures of ricinoleyl alcohol and tetrahydrofurfuryl alcohol, e. g., in approximately equal parts by weight; a mixture of cyclohexanone-glycerine and tetrahydrofurfuryl alcohol; etc. Such hydraulic fluid compositions normally absorb water into solution because of unavoidable contact with water during their use. In any case hydraulic fluid compositions of the water-tolerant type are greatly improved by having dispersed therein an organic base nitrite salt, preferably one or more of the volatile nitrite salts formed by the addition of nitrous acid to an organic nitrogenous base. In this way normally corrodible metals contacting such fluids both in the vapor and liquid phases are prevented from corroding as a result of the water introduced into these fluids during their use.

The present vapor phase inhibitors also have outstanding merit when employed as the corrosion inhibitor in resin-containing hydraulic pressure fluids. For example, a suitable composition having substantial lubricating value due to its viscosity properties has as its predominant constituent an artificial resin formed from aromatic sulfonamides condensed with formaldehyde. About 10 wt. per cent of this resin is dissolved in about 15 wt. per cent of a plasticizing ester of pentaerythritol and/or dipentaerythritol and aliphatic or organic fatty carboxylic acids. Along with the resin and plasticizer there is used about 5 wt. per cent of a chemical polishing agent capable of chemically attacking the microscopic projections of a metal surface and smoothing them out as relatively soft compounds. The total wt. per cent of the resin, the plasticizer, and the polishing agent is usually about 30 wt. per cent and the remainder of the composition (of to about 68 wt. per cent or somewhat higher), is preferably made up with a solvent of the type of a monoethyl ether of diethylene glycol. Preferred liquid-vapor phase inhibitors in this composition, according to the present invention, are about 0.1 wt. per cent to 2.0 wt. per cent, or higher, of di-isopropyl amine nitrite, or di-cyclohexylamine nitrite. This hydraulic composition mixes readily with the more important hydraulic brake fluids commonly used in industry, if such an admixture is desired. The specified resin and plasticizer-containing hydraulic fluid has a water tolerance of approximately 19 wt. per cent at ordinary room temperatures (about 75° F.). Other suitable initially non-aqueous hydraulic fluids may be composed of castor oil admixed with ethanol. A good hydraulic fluid for working at low cold temperatures may be made up of any one or more of the following: ethylene glycol, ethylene glycol monoethyl ether, diethylene glycol monoethyl ether, fusel oil, isoamyl alcohol, diacetone alcohol, or the like thoroughly admixed in each case with triethanol amine and containing preferably 0.1 wt. per cent to 5.0 wt. per cent of one of the present organic base nitrites as the essential corrosion-inhibitor. These produce especially practicable hydraulic fluids. Thus, a mixture of 50 wt. per cent triethanolamine and 49 wt. per cent diethylene glycol monoethyl ether containing 1 wt. per cent of di-cyclohexyl ammonium nitrite does not boil until about 389° F., does not adversely affect rubber in the system, and has a satisfactorily uniform viscosity. A mixture of about 49 wt. per cent of triethanol amine and about 50 wt. per cent of diacetone alcohol containing about 1 wt. per cent of guanidine nitrite, or di-isopropyl ammonium nitrite or morphelinium nitrite is one of a number of compositions which is especially suitable for the purposes mentioned.

The present organic vapor phase corrosion-inhibitors may also be incorporated with pressure-transmitting liquids of the type which are substantially insoluble in water. Some examples of this type of liquid include: hydrocarbons such as hexanes, heptanes, octanes, benzene, toluene, xylenes, cyclohexane, naphthas, kerosene, alkylates, gas oils, light lube oils, trimethyl-cyclohexane, naphthenes, mixtures of diphenyl oxide, aniline, and naphthalene, mixtures of polychlorinated benzenes and polychloroalkylated benzenes, mixtures of a mineral oil with a polymerized hydrocarbon, hydrogenated or non-hydrogenated synthetic polypropylenes, polyalkylene oxides, polyalkylene-esters, esters such as 2-ethyl hexyl sebacate, various other water-insoluble organic compounds, etc. Of the mentioned liquid media, the polyalkylene oxides (e. g., polypropylene- or polyethylene oxides), although substantially not miscible with water for most purposes, will dissolve up to about 3 wt. per cent of water. The other substantially water-insoluble organic liquids tolerate even less water but ordinarily do absorb water as a trace in solution, or as a suspension.

The present organic vapor phase corrosion-inhibitors are also highly useful when incorporated with a hydraulic fluid comprising or consisting of sulfolane or alpha-sulfalene, or substituted compounds having the sulfolane or alpha-sulfolene nucleus, e. g., 2,4-dimethylsulfolane, allyl 3-sulfolanol ether, 3-methylsulfolane, 3-sulfolanyl amine, tetrahydrofurfuryl 3-sulfolanyl ether, etc. Often the sulfolanes or alpha-sulfolenes along with the present inhibitors are admixed with various organic solvents such as alcohols, esters, etc., and/or with various lubricants. Usually from about 5% to about 95% by volume of a sulfolane relative to the finished hydraulic fluid is employed.

Additional materials may also be included in the hydraulic fluids if desired. For example, it will at times be found advantageous to add a small proportion of graphite either alone or in fluid suspensions, such as those known under the trade names of "Castordag," "Aquadag," "Glydag," and the like which are suspensions of graphite in castor oil, aqueous media, and a polyalcohol, respectively. Quantities ranging from about 0.001% to about 0.5% by volume of graphite based on the total fluid composition are usually satisfactory.

Relevant to the application of the present invention to heat exchange media, the universal heat exchange medium in major use, despite many efforts to produce suitable substitutes therefor, is water. Water is most used for heat exchange purposes, not because it is ideal, but because it is relatively efficient during the range of temperatures most commonly used, is lowest in cost, generally readily available, and its boiling point is such that it gives warning of excessive or dangerous temperatures. Nevertheless when used alone or with various additives previously known, water possesses many serious disadvantages. At temperatures in the neighborhood of 160° F. water begins to vaporize materially, and such vaporization causes the formation of gas pockets, i. e., vapor phase regions in which additives to the water used heretofore are not functional. Furthermore, vapor phase regions comprising water vapor and the air normally present in such systems are always present above the liquid phase in such aqueous heat transfer systems. The water, both in the vapor and liquid phases, is highly corrosive to metals coming in contact therewith, especially the walls of cooling and heating systems. There then results both rapid deterioration of such walls and progressively decreasing efficiency of heat transfer due to the insulating layers of corroded and deposited materials.

For low temperature operations in heat exchange media or hydraulic fluids, because of the freezing point of water, its use alone is decidedly unsatisfactory. Water-alcohol, water-glycerol, water-ethylene glycol mixtures are commonly used to avoid freezing and reduce the partial pressure of water vapor above such and the like aqueous media. Many other water-soluble organic compounds having a fairly satisfactory combination of the sought-for properties are also used for the mentioned purposes, e. g., n-butyl Carbitol, cellusolve, various ketones, and alcoholic hydroxyl-containing compounds. However, mixtures of water with ethyl alcohol, or glycerine, or ethylene glycol, or with any of the water-soluble organic compounds indicated herein, are practically as corrosive to metals as water alone. The introduction of one or more organic base nitrites, preferably the organic nitrogenous-base nitrite salts, into any such water-containing mixtures inhibits the corrosion of the metal parts attendant upon the use of the heat exchange media.

The present inventon is thus applicable to the cooling radiators of automobiles subjected to forced circulation through the radiator, and some air is readily dissolved in the water. This invention is also applicable to other aqueous systems such as hot water and steam heating systems, as well as in substantially the same previously described fundamental manner in hydraulic fluids, also in cutting oil emulsions, also in aqueous grinding fluids containing water-soluble organic compounds in this instance without a water-insoluble emulsified oil phase. In the use of aqueous cutting oil emulsions, or solutions, the presence of the present vapor phase inhibitors therein prevents corrosion of the drainage surfaces of the metals in the course of their being subjected to cutting, machining, or grinding.

In all instances the action of the present corrosion-inhibitors appears to be the same. Being soluble in both water and water-soluble organic materials, the inhibitors may easily be incorporated in these organic materials before they are diluted with water for, or during the hydraulic purposes at hand. Thus, when the organic material to which the inhibitors have been added is incorporated with water, either by deliberate introduction of water with agitation in bulk to the concentration conventionally or otherwise desired for a hydraulic fluid, or by external introduction of water vapor and/or liquid water during hydraulic operation of the initially anhydrous water-soluble organic material or composition, the water takes up the inhibitor from the organic material and is rendered innocuous (free of corrosive activity) with regard to the contacting metal surfaces. An important point is that the presence of the water-soluble organic material, even in the highest possible concentrations in the water does not decrease the solubility of the present inhibitors below that of a corrosion-inhibiting amount in the total composition. The present inhibitors are distributed sufficiently in solution in both the organic molecules and the water molecules that corrosion is effectively suppressed regardless of the relative concentration of the water, be it predominant in amount or approaching only a few tenths of one per cent.

Generally, as stated above, the present fluid compositions are highly practical for use in hydraulic machinery for the transmission of pressures, such as the various hydraulic systems used in the operation of airplanes, in hydraulic brake systems, hydraulic shock absorbers, hydraulic jacks, lifts, presses, recoil chambers, dash pots, et cetera.

For purposes of illustration, reference will be had to the following specific examples, it being understood that there is no intention of being limited to the specific conditions disclosed. The percentages specified in these examples are percentages by weight unless otherwise specified.

*Example I*

A freshly cleaned piece of steel plate was immersed for about half its length in a hydraulic fluid made up of 50 parts by volume of ethylene glycol and 50 parts by volume of water, and containing 2 parts by weight of dicyclohexylamine nitrite, and 4 parts by weight of di-isopropyl amine nitrite. A duplicate control test was set up in which the same ethylene glycol-water hydraulic fluid was tested but without the presence of the organic base nitrite salts. The vapor space around the upper half of the steel plates contained air. Both tests were carried out in substantially closed containers maintained at 100° F. The test-pieces of steel were examined from time to time until the control showed a marked amount of corrosion. After thus testing for 75 hours, it was found that the steel plate subjected to the control test was heavily corroded with orange and brown rust. On the other hand, the steel plate tested with the hydraulic fluid containing the specified organic base nitrite salts was completely free from any rust or other manner of corrosion after the 75 hour period of operation.

*Example II*

Solubilities of dicyclohexylammonium nitrite in water, methyl alcohol, and in mixtures of water and ethylene glycol, which are suitable as hydraulic fluids, are shown in the following table:

| Temperature | Parts by weight of Dicyclohexylammonium Nitrite per 100 parts by weight of Saturated Solution in— | | |
| --- | --- | --- | --- |
| | Water | Methyl alcohol | Mixture of 50 wt. per cent of water and 50 wt. per cent of ethylene glycol |
| ° C. | | | |
| 0 | 3.0 | 14.5–14.8 | 4.3 |
| 25 | 4.0 | 22.2–23.6 | 4.5 |
| 45 | 5.2 | 34.7 | 6.8 |
| 65 | 6.9 | | |

In methanol-water and ethylene glycol mixtures with water, the solubility of dicyclohexylammonium nitrite varies with the solvent composition as follows:

| Wt. Per Cent Water in Solvent Mixture | Grams of Dicyclohexylammonium Nitrite per 100 grams of Saturated Solution at 25° C. in— | |
| --- | --- | --- |
| | Methanol-Water Mixture | Ethylene-Glycol-Water Mixture |
| 75 | 6.8 | 4.1 |
| 50 | 13.5 | 4.5 |
| 25 | 21.1–22.5 | 5.5 |

*Example III*

The following is an example of a satisfactory commercial antifreeze composition:

|  | Pounds |
| --- | --- |
| Ethylene glycol | 96.5 |
| Water | 2.0 |
| Di-cyclohexylammonium nitrite | 0.3 |

In some cases it is preferable to use about one pound of the specified organic base nitrite with the above amounts of water and ethylene glycol. A suitable dye to give the composition any desired color may be added in the required portion. If desired, about one gallon of ethylene glycol monoricinoleate may be added to the above composition with advantageous results.

*Example IV*

The following is an example of an improved aqueous alcohol solution which is useful in the cooling system of a conventional internal combustion engine of the liquid-cooled type. To approximately 1000 parts by wt. of an alcohol, e. g., methanol, ethanol, ethylene glycol, or glycerol, 4 to 15 parts by wt. of an oil mixture containing an emulsifier are introduced under vigorous agitation. This oil mixture may consist of about one and one-half parts of sodium naphthenates dissolved in about 9 parts of a paraffin base mineral oil having a Saybolt Universal viscosity of approximately 200 seconds at 100° F. To the resultant composition there is then added with vigorous agitation, either with or without water, an amount of dicyclohexyl amine nitrite approximately equivalent to between about 0.01 wt. per cent and 2 wt. per cent of the total composition diluted with water, a 0.5 wt. per cent concentration of the amine nitrite being preferable. The finished composition is then made up by incorporating any amount of water, depending upon the degree of lowering of the freezing point of water desired.

*Example V*

A hydraulic fluid composition containing a bodying agent has the following composition: 70% monohydric alcohol consisting of 55 parts by wt. of butyl alcohol, 10 parts by wt. of mixed amyl alcohols and 5 parts by wt. of hexyl and heptyl alcohols, 14 wt. per cent ethylene glycol monoricinoleate, and about 2 wt. per cent of one or more of the present organic base nitrites, e. g., di-cyclohexyl amine nitrite, morpholinium nitrite or preferably di-isopropyl amine nitrite. To 100 parts of this mixture there is added 3 parts of a bodying agent such as a low substituted methyl cellulose, or the like.

*Example VI*

Polished steel strips were immersed in water solutions containing 0.05 wt. per cent and 0.1 wt. per cent of sodium chloride respectively and also a 0.0145 molar (0.27 wt. per cent) concentration of 3,3,5-trimethylcyclohexyl amine nitrite. The containers which held these solutions and the steel strips were allowed to stand open to the atmosphere at room temperature for two months. The amine nitrite in these solutions completely protected the steel strips from rusting during two months of operation. In a control test without the amine nitrite a steel strip was badly rusted in less than one hour.

*Example VII*

Drops of the solutions described in the above Example VI were placed upon steel strips which were then stored in closed containers, each of which had an atmosphere having 100% relative humidity. The storage period was for ten days at room temperature. The amine nitrite present in the drops of salt water solutions on the steel completely protected the steel from rusting. The results showed that the presence of the amine nitrite prevented the rusting normally caused by water drops on steel in air.

*Example VIII*

A 0.0125 wt. per cent solution of morpholine nitrite in stagnant distilled water was prepared and then polished steel strips were immersed therein. After standing for five days in contact with this solution at room temperature, rusting of the steel was completely prevented. In a like manner water solutions containing 0.025 wt. per cent, 0.05 wt. per cent, and 0.1 wt. per cent of morpholine nitrite, respectively, inhibited completely the rusting of steel strips during five days of operation. On the other hand, in a control test, the steel strips were badly rusted.

*Example IX*

Specimens of aluminum, copper, brass, and solder (½ inch by 2 inches) were coupled by steel bolts and placed in water containing 30 wt. per cent of ethylene glycol, and also in a like solution except that it contained an added 4.2 wt. per cent of morpholine nitrite. These two solutions were refluxed for 165 hours in all-glass apparatus. In the case in which the morpholine nitrite was present, it was found that the weight losses for all of the metals were substantially less than those obtained in the control test, and no sediment was formed in the solution. On the other hand, in the control test without the organic amine nitrite inhibitor, there was a large amount of loose black and rusty sediment formed in the solution.

The present application is a continuation-in-part of the copending application Serial No. 557,358, filed October 5, 1944, now abandoned.

We claim as our invention:

1. As a composition of matter, a hydraulic fluid comprising essentially a predominant amount of a mixture of ethylene glycol and a substantial amount greater than about 2 weight per cent of water, and between about 0.01 weight per cent and about 30 weight per cent of a secondary amine nitrite salt having a vapor pressure of at least about 0.0001 mm. of Hg at 21° C., the amount of said salt being based upon the total weight of said composition, said composition having a pH of at least about 6.

2. As a composition of matter, a hydraulic fluid comprising essentially a predominant amount of a mixture of ethylene glycol and a substantial amount between about 2 weight per cent and about 70 weight per cent of water, and between about 0.1 weight per cent and about 5 weight per cent of a secondary amine nitrite salt having a vapor pressure of at least about 0.0001 mm. Hg at 21° C., the amount of said salt being based upon the total weight of said composition, said composition having a pH value of at least about 6.

3. As a composition of matter, a hydraulic fluid comprising essentially a predominant amount of an alcoholic hydroxyl-containing water-soluble organic compound and a substantial amount greater than about 2 weight per cent of water, and between about 0.01 weight per cent and about 30 weight per cent of a dicycloalkylamine nitrate salt having a vapor pressure of at least about 0.0001 mm. Hg at 21° C., the amount of said salt being based upon the total weight of said composition, said composition having a pH of at least about 6.

4. As a composition of matter, a hydraulic fluid comprising essentially a predominant amount of a mixture of a water-soluble organic compound and a substantial amount greater than about 2 weight per cent of water, and between about 0.01 weight per cent and about 30 weight per cent of a secondary amine nitrite salt having a vapor pressure of at least about 0.0001 mm. Hg at 21° C., the amount of said salt being based upon the total weight of said composition, said composition having a pH of at least about 6.

5. As a composition of matter, a hydraulic fluid comprising essentially a predominant amount of a mixture of a water-soluble organic compound and a substantial amount greater than about 2 weight per cent of water, and between about 0.01 weight per cent and about 30 weight per cent of an organic amine nitrite salt having a vapor pressure of at least about 0.00002 mm. Hg at 21° C., the amount of said salt being based upon the total weight of said composition, said composition having a pH of at least about 6.

6. As a composition of matter, a hydraulic fluid comprising essentially a predominant amount of a mixture of a water-soluble organic substance and a substantial amount greater than about 2 weight per cent of water, and between about 0.01 weight per cent and about 30 weight per cent of an organic nitrogen-base nitrite salt having a vapor pressure of at least about 0.00002 mm. Hg at 21° C., the amount of said salt being based upon the total weight of said composition, said composition having a pH of at least about 6.

7. As a composition of matter, a hydraulic fluid comprising essentially a predominant amount of a mixture of a water-soluble organic substance and a substantial amount greater than about 2 weight per cent of water, and between about 0.01 weight per cent and about 30 weight per cent of an organic base nitrite salt having a vapor pressure of at least about 0.00002 mm. Hg at 21° C., the amount of said salt being based upon the total weight of said composition, said composition having a pH of at least about 6.

AARON WACHTER.
NATHAN STILLMAN.

REFERENCES CITED

The following references are of record in the file of this patent:

UNITED STATES PATENTS

| Number | Name | Date |
|---|---|---|
| 2,003,429 | Cox | June 4, 1935 |
| 2,173,689 | Lamprey | Sept. 19, 1939 |
| 2,197,775 | Whaley | Apr. 23, 1940 |
| 2,321,517 | Rosen | June 8, 1943 |
| 2,419,327 | Wachter et al. | Apr. 22, 1947 |
| 2,432,839 | Wachter et al. | Dec. 16, 1947 |
| 2,432,840 | Wachter et al. | Dec. 16, 1947 |